May 17, 1927.
W. ROSE
1,628,744
FISH TAPE PULLER
Filed Feb. 21, 1927
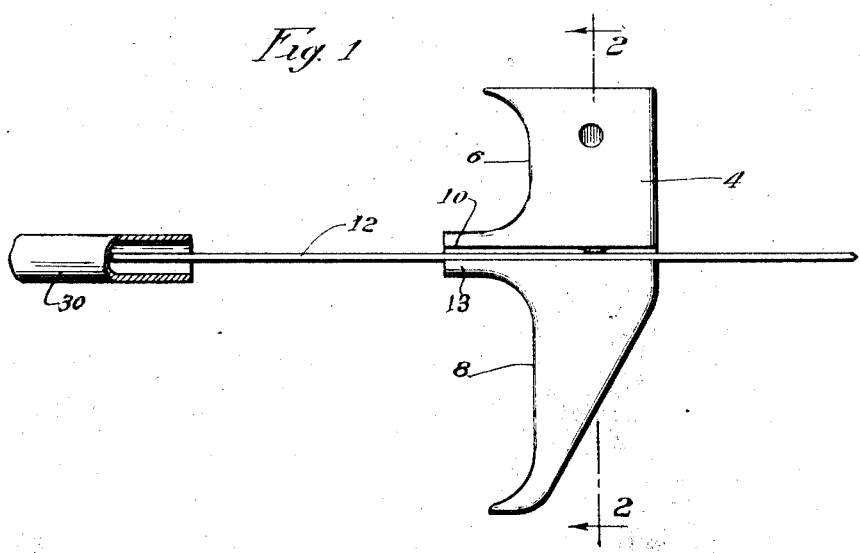
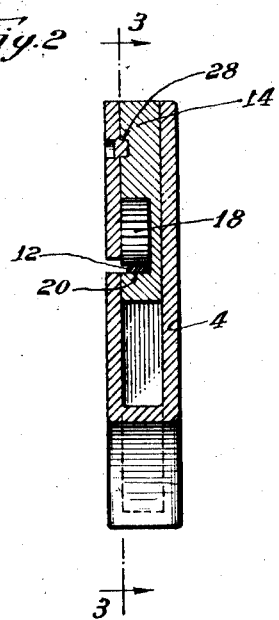
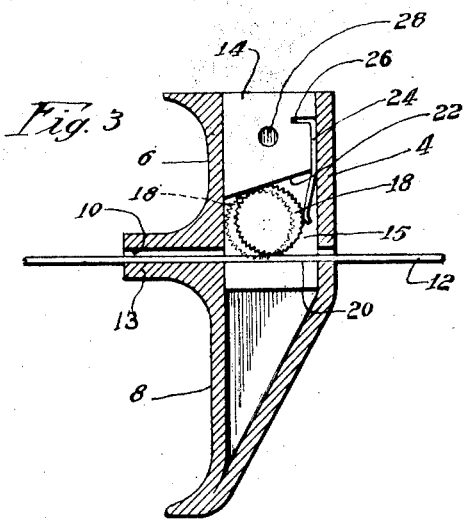
Inventor:
William Rose.
By: Williams, Bradbury,
McCalet & Hinkle
Atty's Patented May 17, 1927.

1,628,744

UNITED STATES PATENT OFFICE.

WILLIAM ROSE, OF CHICAGO, ILLINOIS, ASSIGNOR TO MATHIAS KLEIN & SONS, INC., OF CHICAGO, ILLINOIS, A CORPORATION OF ILLINOIS.

FISH-TAPE PULLER.

Application filed February 21, 1927. Serial No. 169,810.

My invention relates to tools for gripping steel tape or wire so that a pulling force thereon may be easily exerted by hand.

It is an object of my invention to provide a tool of this description which is automatically operable to grip the tape and is automatically released.

A further object is to provide a tool of this type which is simple in construction and may be economically manufactured.

Other objects will appear from the following description, reference being had to the accompanying drawings, in which Fig. 1 is an elevation of the tool.

Fig. 2 is a cross-sectional view thereof, taken on the line 2—2 of Fig. 1; and

Fig. 3 is a cross-sectional view taken on the line 3—3 of Fig. 2.

As is well known in the art of electrical wiring, a steel tape, called a fish tape, is customarily employed to pull the conducting wires through the conduit, the relatively stiff fish tape being first threaded through the conduit, and after attaching the electrical conductors, the fish tape is pulled out, thus drawing the conductors into the conduit. It is difficult to obtain a sufficiently firm manual grip on the fish tape to exert the great force frequently required to pull the conductors through the conduit. The fish tape puller of my invention is designed so that it will firmly grip the fish tape when it is pulled in one direction, and will instantaneously release the tape when it is pushed in the opposite direction.

The tool comprises a body 4, which is conformed so that it may conveniently be grasped in the hand; for example, when used by a right handed person, the first finger may grasp the portion 6, while the second and third fingers may grip about the portion 8. The body is formed of a hollow die casting and has a transverse slot 10 cut across its central portion. This slot is a trifle wider than the fish tape 12 usually employed, so that the latter may be readily inserted in the slot. The projection 13 of the body forms a guard to prevent the tape from cutting the hand of the user of the tool.

A steel block 14 has a wide tapered slot forming a chamber 15 to receive a disc 18, the cylindrical surface of which is milled or serrated. The wall 20 of the slot lies in the plane of one edge of the slot 10. The other wall 22 is spaced from the wall 20 and is at an acute angle relative thereto. The disc 18 is normally held toward the left (Fig. 3) by a spring 24, one end of which fits in a suitable slot 26 in the block 14, the other end engaging the serrated surface of the disc 18. The intermediate portion of the spring lies in a groove formed in the side of the block and is held in position by the inside wall of the body. The block 14 has a recess 28 formed in one side. To maintain the block in proper position, a portion of the side of the body 4 is pressed into this recess by a suitable punch die, as best illustrated in Fig. 2.

From the above description it will appear that the fish tape may easily be inserted from the left (Figs. 1 and 3), the spring permitting the disc to move toward the right and upwardly out of the way from the position shown in dotted lines in Fig. 3 to the position shown in full lines. Upon exerting a pulling force toward the right on the fish tape puller, the spring will force the disc into contact with the surface of the fish tape. As soon as the serrated surface of the disc touches the surface of the fish tape puller, the force of the spring is augmented by the wedging force as the disc is pulled toward the left and slides or rolls on the inclined surface 22. Thus, the gripping or clamping force of the disc is proportionate to the pull exerted.

The great clamping pressures are confined entirely to the block, and the die cast body need be made only sufficiently strong to withstand the pulling force. It is thus possible to make a comparatively light body casting, thus appreciably decreasing the total weight of the tool. The tool may be used as a ratchet, being slid forwardly (to the left, Fig. 1) over the fish tape, and being pulled back (to the right, Fig. 1) to draw the fish tape through the conduit 30.

While I have shown and described my tool as being particularly adapted for use as a fish tape puller, it will be obvious that with or without slight modifications, it may be used for other similar purposes. I, therefore, do not wish to limit the scope of my invention, except as necessary, by the claims which follows.

I claim:

1. In a device of the class described, the combination of a hollow body member, said member being transversely slotted, a block fitting within said body member and having a transverse slot with converging sides, one edge of said slot being in register with the transverse slot of said body, a disc having its cylindrical surface serrated and being freely movable within said last named slot, and resilient means tending to hold said disc in the narrower portion thereof.

2. In a device of the class described, the combination of a hollow body having a transverse slot adapted to receive a metallic tape, a block having a tapered slot secured within said hollow member, a freely slidable disc having a roughened peripheral edge confined within the tapered slot in said block, and a spring confined between the inner wall of said body and said block and adapted resiliently to urge said disc to the narrower portion of said tapered slot.

3. A hand tool comprising a body adapted to be manually grasped, a transverse slot extending the width of said body, a disc having a milled edge confined within said body, resilient means for urging said disc toward one edge of said slot, and a wall at an angle to said slot and engaged by said disc to force the latter into firm gripping engagement with a tape inserted in the slot upon a tensional pull on said tape.

In witness whereof, I hereunto subscribe my name this 18th day of February, 1927.

WILLIAM ROSE.